United States Patent [19]

Sato et al.

[11] Patent Number: 4,929,964

[45] Date of Patent: May 29, 1990

[54] METHOD FOR PREPARING LIQUID JET RECORDING HEAD, LIQUID JET RECORDING HEAD PREPARED BY SAID METHOD AND LIQUID JET RECORDING DEVICE HAVING SAID LIQUID JET RECORDING HEAD MOUNTED THEREON

[75] Inventors: Koichi Sato, Yokohama; Masami Ikeda, Tokyo, both of Japan

[73] Assignee: Canon Kabushiki Kaisha, Tokyo, Japan

[21] Appl. No.: 363,524

[22] Filed: Jun. 7, 1989

[30] Foreign Application Priority Data

Jun. 7, 1988 [JP] Japan ................................ 63-138418

[51] Int. Cl.[5] .......................... G01D 15/16; B41J 3/04

[52] U.S. Cl. ................................. 346/1.1; 346/140 R

[58] Field of Search .................... 346/140, 1.1; 29/611

[56] References Cited

U.S. PATENT DOCUMENTS 4,296,421 10/1981 Hara et al. .
4,463,359 7/1984 Ayata et al. .
4,694,306 9/1987 Ikeda et al. .
4,712,172 12/1987 Kiyohara et al. .
4,719,472 1/1988 Arakawa .
4,860,033 8/1989 Shiozaki et al. .

FOREIGN PATENT DOCUMENTS 2159465 12/1985 United Kingdom .
2169855 7/1986 United Kingdom .
2169856 7/1986 United Kingdom .

*Primary Examiner*—Joseph W. Hartary
*Attorney, Agent, or Firm*—Fitzpatrick, Cella, Harper & Scinto

[57] ABSTRACT

A method for preparing a liquid jet recording head which is to be used for generating heat energy to be utilized for discharging ink by applying electrical signals, having an electricity-heat energy convertor comprising a heat-generating resistor and a pair of electrodes for applying electrical signals on said heat-generating resistor, comprises the process of aging by heat treating the heat-generating resistor by applying electrical signals to said electrodes sufficient to stabilize the resistance value of said heat-generating resistor.

33 Claims, 5 Drawing Sheets

METHOD FOR PREPARING LIQUID JET RECORDING HEAD, LIQUID JET RECORDING HEAD PREPARED BY SAID METHOD AND LIQUID JET RECORDING DEVICE HAVING SAID LIQUID JET RECORDING HEAD MOUNTED THEREON

BACKGROUND OF THE INVENTION

1. Field of the Invention

This invention relates to a method for preparing a liquid jet recording head to be mounted on a liquid jet recording device which performs recording by discharging liquid by utilizing heat energy to form discharged droplets and attaching the droplets onto a recording medium such as paper, etc.

Also, the present invention relates to a liquid jet recording head prepared according to the above preparation method.

Further, the present invention relates to a liquid jet recording device having the liquid jet recording head prepared according to the above preparation method mounted thereon 2. Related Background Art Liquid jet recording method is a recording method which performs recording by forming discharged droplets of a recording liquid such as ink, etc. according to various system, and attaching the droplets to a recording medium such as paper, etc.

Among recording devices to which such recording method is applied as the device having a structure suitable for high density multi-openings, a liquid jet recording device of the type utilizing heat energy for discharged droplet formation can be included.

The liquid jet recording device utilizing heat energy as the droplet discharging energy generally has a liquid jet recording head having a droplet forming means and a liquid heating means for forming droplets of a recording liquid. The above droplet forming means has discharging openings for discharging droplets and liquid channels, including portions imparting heat to the recording liquid, and the above liquid heating means includes an electro-thermal energy convertor comprising a heat-generating resistor capable of heating the recording liquid (hereinafter called heater) and a pair of electrodes for applying electical signals to the heat-generating resistor.

The droplet forming means forms droplets of a recording liquid by applying predetermined recording signals from the electrodes to heater to generate heat from the heater, heating the recording liquid by the heat generated and creating a pressure displacement, accompanied with the volume increase caused by the abrupt foaming of the recording liquid, thereby discharging the recording liquid through the droplet discharging openings.

On the other hand, as the recording liquid to be used during recording by a liquid jet recording device, an aqueous recording liquid has been primarily used in aspects such as recording characteristics, stability in discharging, etc.

Such aqueous recording liquid is formed generally of a recording agent component such as pigment, dye, etc. and a solvent component composed primarily of water or water and a water-soluble organic solvent for dissolving or dispersing the recording agent.

In this connection, the heating limit temperature for effecting abrupt gasification of the recording liquid containing the solvent component comprising water and a water-soluble organic solvent, namely the temperature at which evaporation at the liquid-gas interface by the heat content transmitted by thermal conduction through a very thin and stable vapor membrane between the heat transmitting surface and the liquid, is 250° C. to 350° C.

Accordingly, for performing recording by foaming and discharging the recording liquid by applying electrical signals to the heater by use of a recording liquid having such temperature characteristics, the heater will generate heat repeatedly from normal temperature to 300° to 800° C. every time when electrical signals are applied.

The heater may be formed by laminating a wiring portion comprising a metal which is a good electroconductor (electrode such as Al, Au, Ag, Cu, etc.) through an intermediate layer (Ti, Cr, etc.) on a heat-generating resistor (e.g. heat resistant resistance material such as $HfB_2$, $ZrB_2$, $TaN_2$, TaSi, etc.) provided on a substrate (e.g. Si, glass, ceramics, etc.) so that the intermediate layer may be exposed. Thus, the portion of the intermediate layer exposed becomes the heater.

Further, if necessary, a protective layer excellent in heat resistance, ink shielding characteristic (e.g. $SiO_2$, $Al_2O_3$, $Si_3N_4$, etc.) is provided on at least the heater and the electrodes for preventing electrocorrosion, oxidation caused by the recording liquid, whereby recording liquid is shielded from these.

In the recording device with the constitution which performs droplet discharging by heating the recording liquid through repeated heat generation to high temperature from the heater with the constitution as described above with the electrical signals corresponding to the recording signals, for the purpose of improving recording characteristics (particularly characteristics of recording liquid, for example, viscosity, etc.) during recording, there have been practiced in the prior art the preliminary discharging treatments as disclosed in U.S. Pat. No. 4,712,172 and G.B. Patent Nos. 2159465, 2169856 and 2169856 or the preliminary heating treatments as disclosed in U.S. Pat. Nos. 4,463,359, 4,296,421 4,719,472 and 4,712,172, and G.B. Patent Nos. 2169855 and No. 2169856 as included in the recording mode after the liquid recording device is sold under the state where the liquid jet recording head is mounted on the above device.

By performing such treatment as described above, primarily the characteristics of the recording liquid may be improved during recording, but it may not be necessarily satisfactory as the method for accomplishing the best recording state, particularly from the initial stage.

Thus, by repeated high temperature heat generation of the heater material in the recording mode including the preliminary discharging treatment and the preliminary heating treatment as described above, phase change, stress change, oxidation and composition change may be sometimes caused to occur, whereby the resistance value of the heater material was liable to be changed gradually.

Also, changes will occur in the resistance distribution of the heater material by the interface resistance in the boundary region between the heater material and the wiring portion (electrodes), and further by the diffusion phenomenon between the above-mentioned members, etc.

If the change in heater resistance value is thus generated, the heat energy generated from the electrical signals initially set will be increased or decreased corresponding to the resistance change and will deviate from the desired value. As the result, the droplet discharging rate and its discharging amount will become gradually different from those initially set.

And, finally, when these exceed the preferable ranges for discharging of the recording liquid, deterioration in quality of recorded images to be formed by discharging of the recording liquid will be brought about.

Further, when the resistance value tends to be reduced, the heat energy generated by the heater is increased, and the heater generates more heat than the set value, whereby the heater life will be significantly reduced due to such problems as cavitation, heat resistance of the heater material, etc.

Accordingly, there have been investigated the methods in which such change in heater resistance value can be maintained within the range which will not cause defective printing and durability deterioration of the heater material.

As one method, for example, in preparation of the liquid jet recording device, there may be included the method in which the resistance value change of the heater is made smaller by applying heat treatment on the whole recording head during completion of the recording head.

Whereas, when the treatment according to such preparation method is applied, even the portion where no heating treatment other than heater is required will be heated. Accordingly, inconveniences due to heating will frequently occur at the portion where no heating is necessary. More specifically, due to the increase in internal stress of the recording head by the heating treatment, there have been generated problems such as generation of cracks or defects, warping of the recording head itself, poor adhesion on account of peel-off between the constituent members of the recording head, etc.

Further, there also occurred such problems as poor electrical resistance or contact due to oxidation of the bonding portion on account of electrical connection of the recording head to its external device, or deterioration in adhesion at their portions, etc.

Further, for obtaining the stabilizing effect of the resistance value of the heater in this method, the heating temperature is required to be made as high as 500° C. or higher, whereby the materials available for the recording head constituent members are restricted to result in increased preparation cost.

SUMMARY OF THE INVENTION

The present invention has been accomplished in view of these problems, and an object of the present invention is to provide a method for preparing a liquid jet recording head in which the heater resistance change can be suppressed within a suitable range for obtaining constantly good droplet discharging state from the initial stage of recording, and constantly good and stable droplet discharging can be obtained particularly even in recording for prolonged time.

Another object of the present invention is to provide a method for preparing a liquid jet recording head in which a liquid jet recording head of high durable life to repeated heat generation over a long term in the heater of the recording device is obtained.

Still another object of the present invention is to provide a method for preparing a liquid jet recording head, in which variance in preparation can be suppressed and good and stable droplet discharging state can be obtained inexpensively and easily.

Still another object of the present invention is to provide a liquid jet recording head which is suppressed in heater resistance change within a suitable range for obtaining constantly good droplet discharging state, giving constantly good and stable droplet discharging state particularly in recording over a long time.

Still another object of the present invention is to provide a liquid jet recording head of high durable life to repeated heating in the heater of recording device over a long term.

Still another object of the present invention is to provide a liquid jet recording head which is suppressed in variance in preparation to give good and stable droplet discharging state inexpensively and easily.

It is a further object of the present invention to provide a liquid jet recording device mounted with a liquid jet recording head having excellent characteristics as described above.

Still another object of the present invention is to provide a method for preparing a liquid jet recording head which is to be used for generating heat energy to be utilized for discharging ink by applying electrical signals and has an electricity-heat energy converter comprising a heat-generating resistor and a pair of electrodes for applying electrical signals on said heat-generating resistor, comprising the step of aging according to the heating treatment of said heat-generating resistor which generates heat from said heat-generating resistor by applying electrical signals from said electrodes enough to stabilize the resistance value of said heat-generating resistor through the action of heating by the heat generation.

Still another object of the present invention is to provide a liquid jet recording head which is to be used for generating heat energy to be utilized for discharging ink by applying electrical signals and has an electricity-heat energy convertor comprising a heat-generating resistor and a pair of electrodes for applying electrical signals on said heat-generating resistor, prepared by a method comprising the step of aging according to the heating treatment of said heat-generating resistor which generates heat from said heat-generating resistor by applying electrical signals from said electrodes enough to stabilize the resistance value of said heat-generating resistor through the action of heating by the heat generation.

Still another object of the present invention is to provide a liquid jet recording device provided with a liquid jet recording head which is to be used for generating heat energy to be utilized for discharging ink by applying electrical signals and has an electricity-heat energy convertor comprising a heat-generating resistor and a pair of electrodes for applying electrical signals on said heat-generating resistor, said liquid jet recording head being prepared by a method comprising the step of aging according to the heating treatment of said heat-generating resistor which generates heat from said heat-generating resistor by applying electrical signals from said electrodes enough to stabilize the resistance value of said heat-generating resistor through the action of heating by the heat generation.

DETAILED DESCRIPTION OF THE PREFERRED EMBODIMENTS

Figure 1:
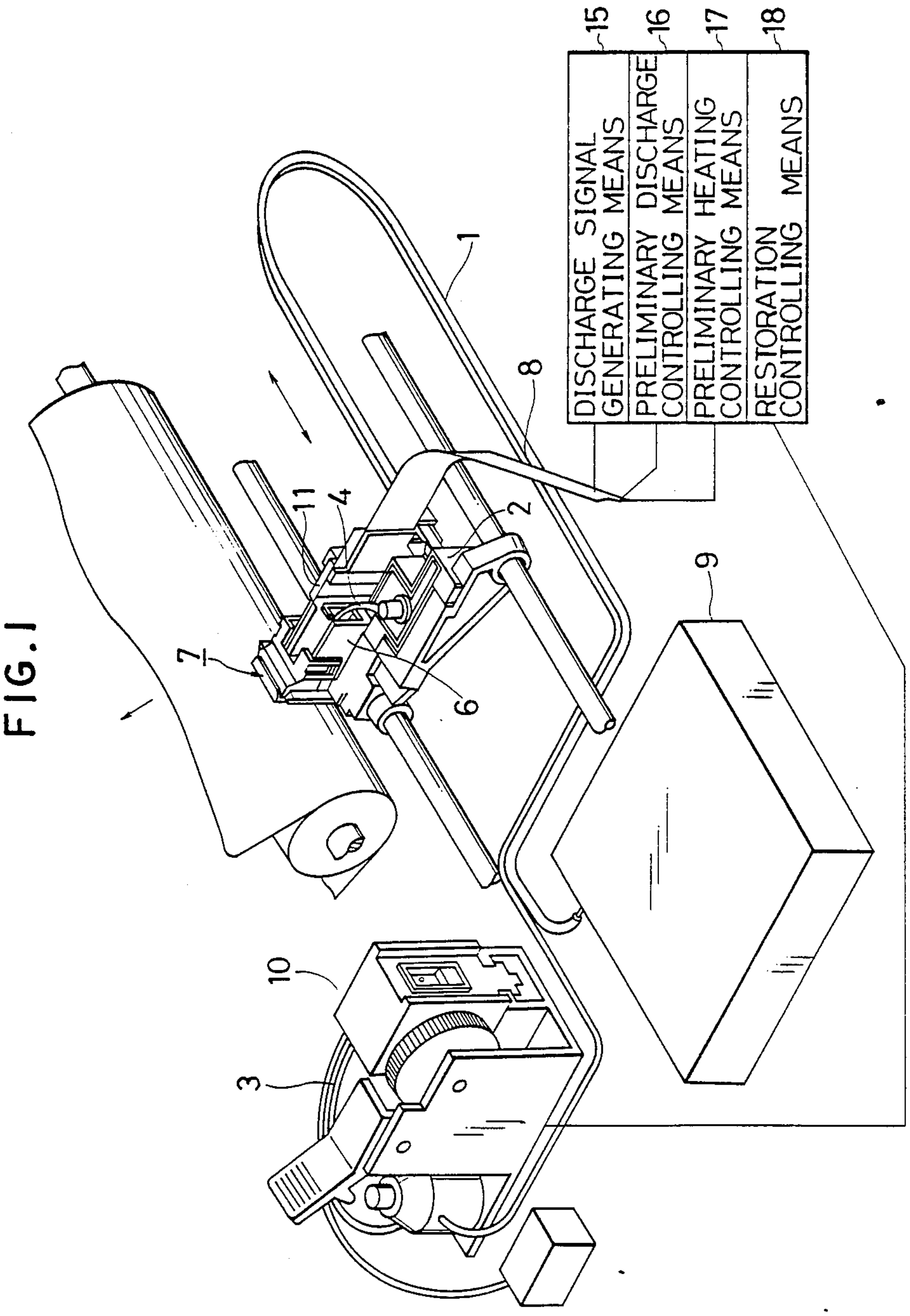
FIG. 1 is a schematic illustration of the liquid jet recording device according to the present invention.

Referring now to the drawings, the present invention is to be described in detail.

Figure 2:
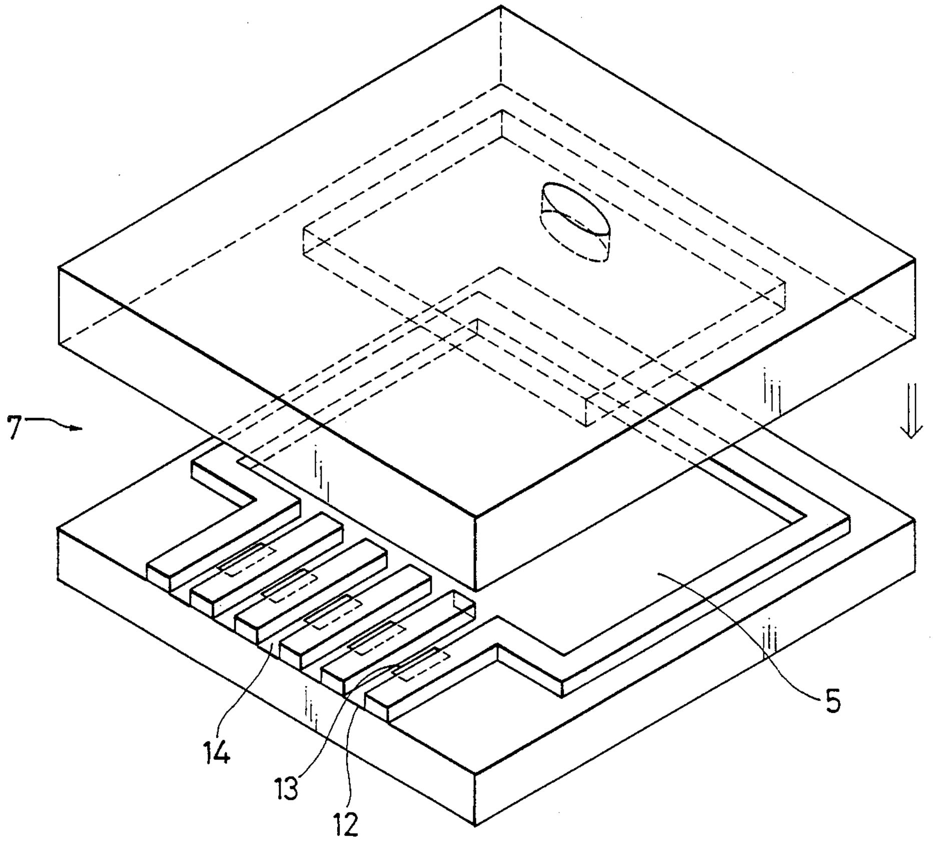
FIG. 2 is an enlarged exploded perspective view of the principal portion of the liquid jet recording head according to the present invention mounted on the device in FIG. 1.

FIG. 1 is a schematic illustration of the liquid jet recording device having the liquid jet recording head prepared by the method according to the present invention and FIG. 2 is an enlarged exploded perspective view of the principal portion of the liquid jet recording head to be mounted on the device shown in FIG. 1.

As shown in FIG. 1 and FIG. 2, the liquid jet recording device according to the present invention has a constitution as described below. That is, 1 is a feeding tube which connects the main tank 9 for storage of recording liquid to the subtank 2 for storing temporarily the recording liquid within the recording device for feeding the recording liquid from the main tank 9 to the subtank 2, 3 is an aspiration tube connected to a restoration pump which tube is communicated to a cap member 10 which is in contact with the recording head 7 and used for discharging restoration treatment of the recording head or capping treatment, 4 a feeding tube unit for feeding the recording liquid from the subtank 2 to the liquid chamber 5, 6 a pressing member for the feeding tube unit 4, 7 a recording head having a predetermined number of droplet discharging openings which are portions for discharging the recording liquid arranged in a vertical direction as shown in FIG. 2, 8 an electrical wiring portion comprising a flexible print substrate (hereinafter referred to as FPC) for applying signals from the discharging signal generating means 15 to the heater 13 for imparting heat energy to the recording liquid within the liquid channel 14 shown in FIG. 2 or applying signals from the preliminary discharging treatment control means 16 or the preliminary heating treatment means 17, 11 a base plate for supporting the arrangements of the feeding tube unit 4, the liquid chamber 5, the recording head 7, the feeding tube press 6 and FPC 8.

In this example, as shown in FIG. 2, the droplet forming means for forming discharging droplets is constituted of droplet discharging openings 12 and the liquid channel 14 communicated thereto including the portion for imparting the heat from the heater 13 to the recording liquid. On the other hand, the liquid heating means (electro-thermal energy convertor) is comprised of the heater 13 and a pair of electrodes not shown (the electrodes receive recording signals from FPC 8) for applying electrical signals when necessary.

For performing recording by use of this device, first the recording liquid is filled with recording liquid from the main tank 9 through the feeding tube 1 and the feeding tube unit 4 into the subtank 2, the liquid chamber 5 and the liquid channel 14. Next, from FPC 8 through the electrodes, signals for recording, namely electrical signals from the discharging signal generating means 15, are applied on the heater 13. By this, the heater 13 generates heat and the heat energy is imparted to the recording liquid existing within the liquid channel 14 in the vicinity of the heater 13. By imparting thus the heat energy from the heater 13 to the recording liquid, there occurs generation of bubbles within the recording liquid which is accompanied with momentary volume increase of the recording liquid at that portion. By this, the recording liquid existing on the downstream side of the heater is discharged from the discharge opening 12 to form droplets of the recording liquid. The droplets of the recording liquid are permitted to be attached onto a recording medium such as paper delivered ahead of the recording head, thus effecting recording of a desired image.

During recording with the recording device as described above, for the purpose of making adequate discharging of the ink from the recording head thereby to form an image of high quality, preliminary discharging treatment, preliminary heating treatment or restoration treatment of recording head may be practiced. These treatments are controlled by the preliminary discharging treatment control means 16, the preliminary heating control means 17 or the restoration treatment control means 18, and can be practiced as assembled as a series of modes during recording or alternatively independently of one another.

The above preliminary discharging treatment and the preliminary heating treatment control primarily the viscosity, etc. of the recording liquid, while the restoration treatment restores clogging, etc. of the discharging openings by pressurizing or aspirating the ink within the recording head under the state with the recording head 7 in contact with the cap member 10.

In the method for preparing the liquid jet recording head of the present invention, there is incorporated the aging step which stabilizes the resistance value of the heater 13 by applying electrical signals to the heater, 13, thereby effecting the heating treatment only in the vicinity of the heater 13 at any stage during preparation of the liquid jet recording head mounted on the device having the constitution as described above.

The aging process according to the heat treatment as described above can be incorporated in a series of the preparation steps of the liquid jet recording head after formation of the electricity-heat energy convertor including the heater and the electrodes for applying electrical signals on the heater which constitute the liquid jet recording head. Alternatively, it is also possible to effect the heating treatment on the above recording head after completion of the liquid jet recording head prior to mounting onto the recording device, and also the above heating treatment can be practiced after mounting onto the recording device before the state where conventional recording is to be practiced (e.g before the recording device is sold).

However, to simplify the heating treatment, it should preferably be practiced after completion of the recording head.

Particularly, it is preferable to practice the aging process after completion of the recording head capable of applying signals at once onto a plurality of recording heads prior to mounting thereof onto the recording device. In this case, a device for applying electrical signals to a plurality of the respective recording heads is separately required.

In contrast, when the heating treatment is performed under the state where the recording head is mounted on the recording device, no separate device for the heating treatment becomes necessary. On the other hand, under the state where the recording head is mounted on the recording device, it is possible to make the recording head under the state when the heat is filled with the recording liquid, and the heating treatment under the state filled with the recording liquid improves wettability between the recording liquid and the heat-generating resistor (or between the recording liquid and the liquid channel), whereby further stabilized discharging of the recording liquid can be effected. Thus, it is also preferable to perform the above heating treatment with the recording head under the dischargeable state filled with the recording liquid after completion of assembly of the recording device.

Also, in the two examples of the heating treatment as described above, even when the heating treatment may be practiced prior to mounting of the recording head onto the recording device, the same effect can be obtained by filling the recording head with the recording liquid.

In addition, in the heating treatment when the recording head is mounted to the recording device, it is not necessarily required that the recording head should be made under the state filled with the recording liquid.

Other steps than the above heating treatment of the heater in the method for preparing the liquid jet recording head of the present invention may be the same as in conventional methods for preparing liquid jet recording devices.

As the signals for heater heat treatment to be applied in the preparation method of the present invention, for example, there can be applied electrical signals which generate greater heat energy in the heater during treatment, than the electrical signals applied for discharging and can generate heat from the heater 13 to a temperature at which the resistance change of the heater due to heat history of the heater 13 can be subsided by the discharging electrical signals to the range which can persist stable discharging. The signals for heater heat treatment can be applied, from a heating signal generating means, not shown, via FPC 8.

As the signals to be applied as the signals for heat treatment of the above heater, high frequency signals or direct current can be applied. In the case of the above high frequency signals, the desired heating treatment can be done by varying application voltage, application pulse width, application pulse number or frequency, etc. individually or in combination. In the case of applying direct current, the desired heat treatment can be done by controlling its current value and its application time.

The heat treatment time of the heater 13 by application of electrical signals for heating should be preferably as short as possible within the range where the above effect can be obtained.

This is because, by application of the treatment with short heating time, the influence by heat which may cause deterioration, etc. on the heater 13 and the constituent members around the heater can be made as small as possible, to thereby prolong the life of those members and also diffusion of heat around the heater can be suppressed.

In the following, specific examples of the method for preparing the liquid jet recording head in which the aging process was performed according to the heating treatment by varying application voltage, application pulse width, application pulse number of high frequency signals applied or direct current are to be described.

In the examples shown below, description is made by referring to a recording head in the form in which the discharging direction of the ink and the feeding direction of the ink into the channel provided with the heater are substantially in parallel to each other, but the present invention is not limited thereto, and can be also applied to a recording head in the form in which the above two directions are in different directions, for example, perpendicular to each other.

EXAMPLE 1

A number of recording heads having a constitution as shown in FIG. 2 were trially made, and the effect of the heating treatment on the heater was examined by discharging recording liquid through all the discharging outlets before mounting the head onto the liquid jet recording device and under the state where the recording head was filled with liquid.

| | |
|---|---|
| Constitution of recording head: | |
| Substrate Si (attached with thermally oxidized $SiO_2$ film) | 1 mm |
| Heat-generating resistor $HfB_2$ (sputtered film) | 0.1 μm |
| Electrode Al | 0.5 μm |
| Protective layer $SiO_2$ | 2 μm |
| Electrical signal application conditions for heating treatment with heater: | |
| Pulse width: 7 μs, Frequency: 2 KHz, $10^6$ pulses (therefore heating treatment time corresponds to 8 min. 20 sec.) | |
| Voltage: 20–26 V. | |

Figure 3:
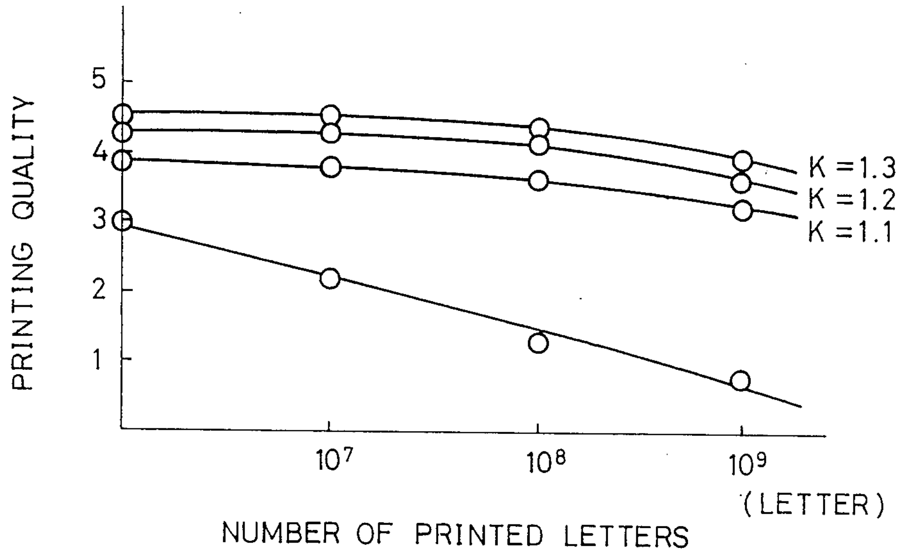
FIGS. 3 through 8 are characteristic graphs showing the characteristics of the recording head prepared according to the method for preparing the liquid jet recording head according to the present invention, FIG. 3 showing the relationship between printing quality and printing number with K value as the parameter, FIG. 4 the relationship between printing quality and K value, FIG. 5 the relationship between ΔR/R and pulse number with K value as the parameter, FIG. 6 the relationship between life and pulse number with K value as the parameter, FIG. 7 the relationship between printing quality and pulse width and FIG. 8 the relationship between printing quality and direct current value.

When the change in printing quality versus printing number was evaluated, the results as shown in FIG. 3 were obtained.

That is, when the relationship between the K value ($=V/V_0$), which is the ratio of the foaming initiation voltage ($V_0$) at which the recording liquid begins to foam to the application voltage (V), and the printing quality was evaluated, a difference in change of printing quality was seen depending on the value greatness (K value) of the application voltage during the heating treatment, and more particularly, deterioration of printing quality was found to be greatest in the case of no treatment.

Figure 4:
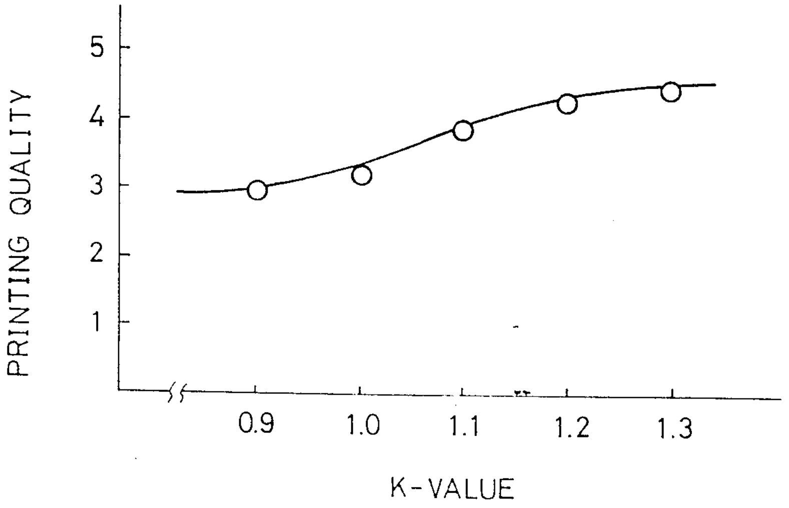

Also, as shown in FIG. 4, the effect was found to be higher as the K value during the heating treatment was higher. As is apparent from these FIG. 3 and FIG. 4, stable and good printed images with little deterioration of resistance values of heater can be obtained by carrying out the heating treatment at high K value.

The printing quality was measured according to the method in which the deviation amount from the respective minimum square lines of longitudinal and lateral lines in the printed matter are measured by the whole dot microscope is an average value of measurements of shooting point errors at 5 stages which were conducted for 10 devices under the respective conditions. In this case, as described above, the heating treatment conditions of the heater are the same except for the above K value.

Figure 5:
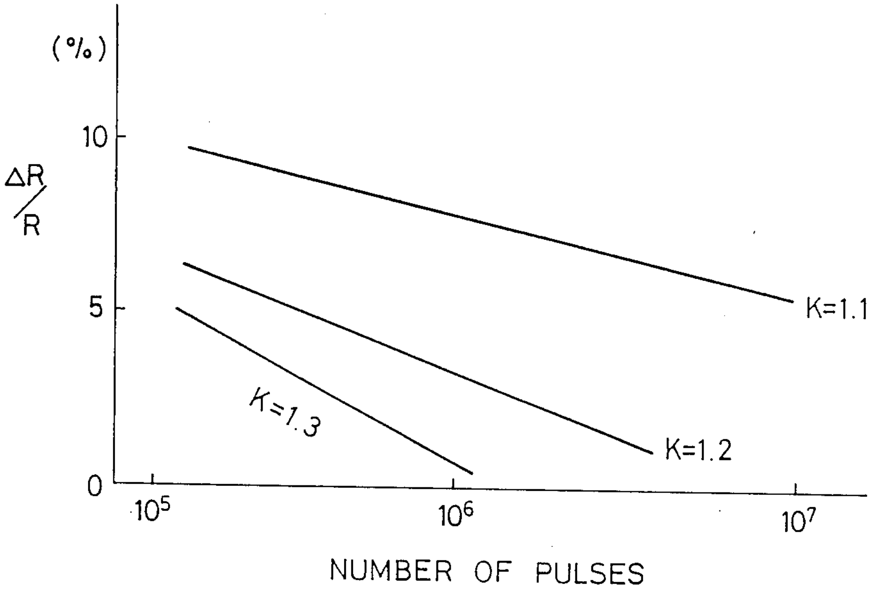
Figure 6:
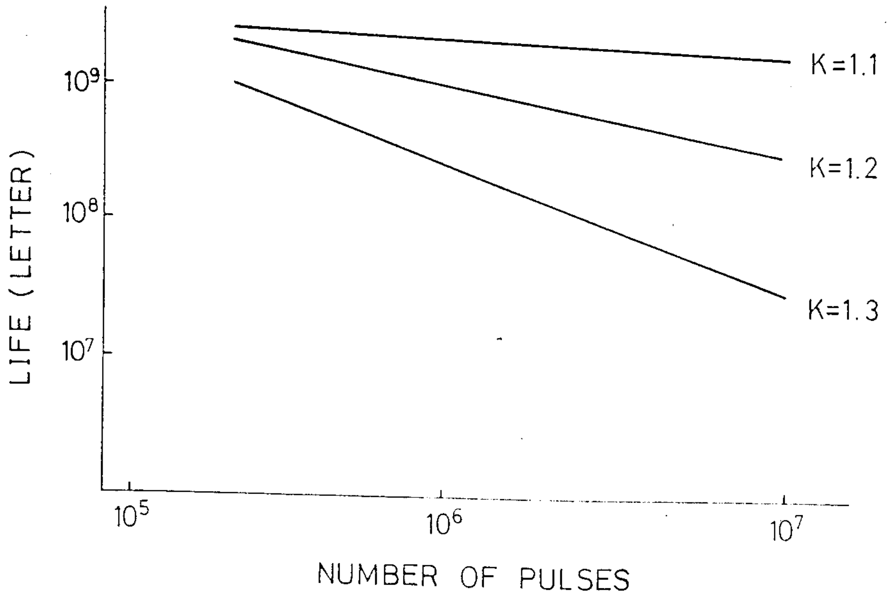

Next, the relationship between the heating treatment time (represented as pulse number) and the heater resistance value change rate after the treatment was examined to obtain the result as shown in FIG. 5. That is, the heater resistance value can be stabilized at fewer pulse number as the K value during the heating treatment is higher. ΔR/R is an average of the change in the value of the resistance R of the heater after the printing of $10^8$ letters.

On the other hand, when the relationship between heater life and K value was examined, heater life exhibited a contrary tendency, with the life being shorter as the K value during the heating treatment is increased and the heating treatment is longer.

From the above results, when adequate heating treatment conditions of the heater are selected, in this Example, for improving wettability between the recording liquid and the heater or between the recording liquid and the liquid pathway simultaneously with maintaining the initial characteristics and also realizing a recording head of long life, it has been found that K value = 1.5 to 1.25 and pulse number = $1\times10^5$ to $1\times10^7$, particularly $1\times10^6$ to $1\times10^7$ during the heating treatment are most desirable.

Also, the same results as described above were obtained when the heating treatment as shown in Example 1 was conducted under the state where no recording liquid was filled within the liquid jet recording head.

EXAMPLE 2

The effect of the heating treatment was examined by use of a recording head having the same constitution as in Example 1. In this Example, shooting point error measurement was conducted similarly as in Example 1 by varying the pulse width within the range of 2 to 12 μs, with other application conditions being constant, to determine the optimum heating treatment conditions.

Figure 7:
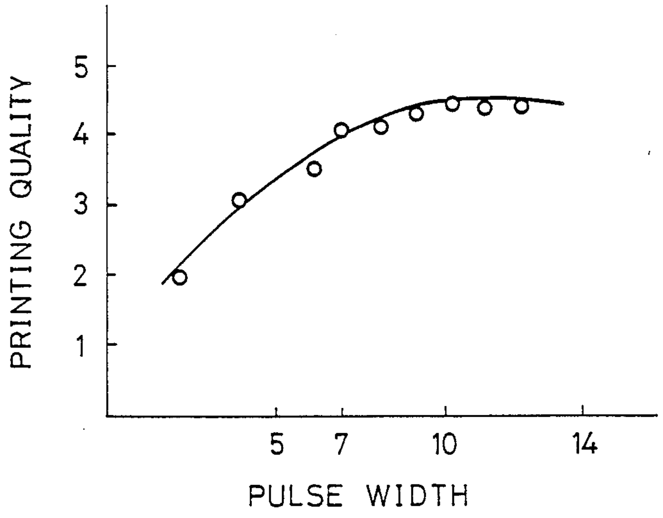

As the result, changes in printing quality according to printing number were evaluated to obtain the results as shown in FIG. 7.

Thus, effective heating treatment could be conducted when a pulse width within the range of P = 1.30 to 1.55 was applied, wherein P represents the relationship of the applied pulse width $P_1$ relative to the pulse width 7 μs (Po) when the voltage value is made the foaming initiation voltage.

Also, the same results were obtained when the heating treatment as shown in Example 2 was conducted under the state where the recording liquid was filled within the recording head.

EXAMPLE 3

By use of the recording head of Example 1, the heating treatment of the heater was practiced as described below by performing heating with direct current in place of pulse current.

Between the common electrode and the respective segment electrodes (parallel) of the recording head, current is supplied from a D.C. power source for 60 seconds. The current value was varied between 1 mA and 100 mA and its effect was examined according to the same method as in Examples 1 and 2.

Figure 8:
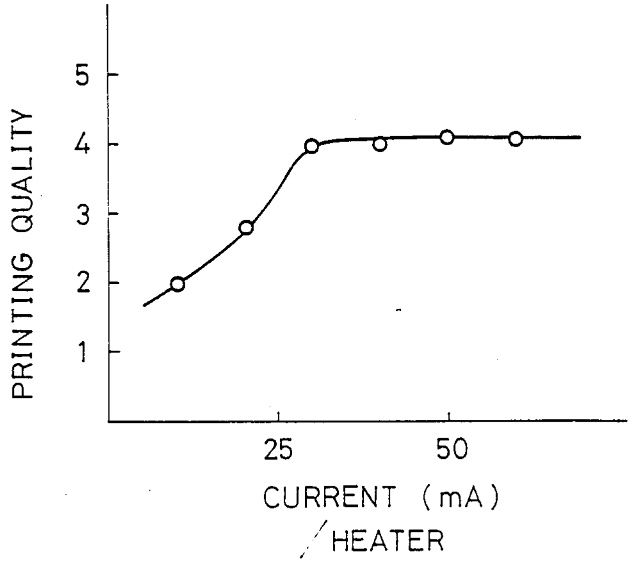

As the result, as shown in FIG. 8, the effect of the heating treatment of the heater was exhibited markedly by making the current value per heater 30 mA or higher. In the case of Example 3, even when ink was filled within the recording head, no foaming and discharging of ink was effected, but the effect of the surface treatment of heater was the same as in Examples 1 and 2.

EXAMPLE 4

By use of the recording head having the same constitution as shown in Example 1, heating treatment was conducted under the conditions a to f shown in Table 1.

TABLE 1

| Heating treatment conditions | Voltage (K value) | Pulse number | Pulse width (μ s) | Frequency (KHz) | Heating treatment time |
|---|---|---|---|---|---|
| a | 1.18 | $1\times10^6$ | 7 | 2.0 | 8 min. 20 sec. |
| b | 1.18 | $1\times10^6$ | 10 | 1.2 | 13 min. 53 sec. |
| c | 1.15 | $1\times10^6$ | 10 | 2.5 | 6 min. 40 sec. |
| d | 1.15 | $1\times10^6$ | 10 | 2.0 | 8 min. 20 sec. |
| e | 1.23 | $1\times10^6$ | 7 | 4.0 | 4 min. 10 sec. |
| f | 1.24 | $5\times10^5$ | 5–7 | 4.0 | 2 min. 5 sec. |

Under all of the treatment conditions, the liquid jet recording heads obtained were found to be suppressed in heater resistance change within a suitable range for obtaining constantly good droplet discharging state from the initial stage of recording.

As is apparent from the above results, it is preferable to perform the heating treatment at a K value of 1.15 to 1.25, a pulse number of $1\times10^5$ to $1\times10^7$, a pulse width of 5 to 10 μs, a frequency of 1.0 to 4.0 KHz for a heating treatment time of about 2 minutes to 15 minutes. However, so long as the initial purpose can be accomplished, numerical values exceeding these ranges may be also set.

Table 2 shows an example of the ink discharging conditions, preliminary discharging treatment conditions and preliminary heating treatment conditions during recording with the recording head shown in Example 1.

TABLE 2

| | Voltage (K value) | Pulse width (μ s) | Frequency (KHz) | Heating temperature (°C.) | Discharging number |
|---|---|---|---|---|---|
| Ink discharging conditions | 1.15 | 5–10 | 1.2–4.0 | — | — |
| Preliminary discharging treatment conditions | 1.15 | 7–10 | 0.5–2.5 | — | 50–3000 |
| Preliminary heating treatment conditions | 1.15 | 2 | 7–11 | 30–40 | — |

As shown in Table 2, all of the ink discharging conditions, preliminary discharging treatment conditions, preliminary heating treatment conditions are entirely different from the heater heating treatment conditions of the present invention. Therefore, it is difficult to improve the characteristics of the heater by these treatments, for example, preliminary discharging treatment or preliminary heating treatment.

As described above, according to the present invention, there can be provided a method for preparing a liquid jet recording head in which the heater resistance change can be suppressed within a suitable range for obtaining constantly good droplet discharging state from the initial stage of recording, and constantly good and stable droplet discharging can be obtained particularly even in recording for prolonged time.

Also, there can be provided a method for preparing a liquid jet recording head in which a liquid jet recording head of high durable life to repeated heat generation over a long term in the heater of the recording device is obtained.

Further, there can be provided a method for preparing a liquid jet recording head, in which variance in preparation can be suppressed, and wettability between the recording liquid and the heater or between the recording liquid and the liquid pathway is improved, thereby giving good and stable droplet discharging state in expensively and easily.

Further, there can be provided a liquid jet recording head which is suppressed in heater resistance change within a suitable range for obtaining constantly good droplet discharging state, giving constantly good and stable droplet discharging state particularly in recording over a long time.

Also, there can be provided a liquid jet recording head of high durable life to repeated heating in the heater of recording device over a long term.

Further, there can be provided a liquid jet recording head which is suppressed in variance in preparation to give good and stable droplet discharging state inexpensively and easily.

Further, there can be provided a liquid jet recording device mounted with a liquid jet recording head having excellent characteristics as described above.

What is claimed is:

1. A method for preparing a liquid jet recording head, comprising the steps of:

providing a liquid jet recording head having an electro-thermal energy convertor for generating heat energy for discharging ink by applying electrical signals to said electro-thermal convertor, said electro-thermal energy convertor comprising a heat-generating resistor and a pair of electrodes for applying electrical signals to said heat-generating resistor; and aging said heat-generating resistor by applying to said electrodes electrical signals sufficient to stabilize the resistance value of said heat-generating resistor by heat treating said heat-generating resistor through heat generation therein.

2. A method for preparing a liquid jet recording head according to claim 1, wherein the electrical signals for said heat treatment are high frequency signals.

3. A method for preparing a liquid jet recording head according to claim 1, wherein said electrical signals for heat treating have a larger pulse width and/or voltage value than the electrical signals used for discharging liquid.

4. A liquid jet recording head prepared according to the method of claim 1.

5. A method according to claim 3, wherein when the foaming initiating voltage is defined as $V_0$ and the application voltage during heat treating as V, said electrical signals are applied at a voltage within the range of 1.15 to 1.25 of K-value which is their ratio ($=V/V_0$).

6. A method according to claim 3, wherein when the foaming initiating pulse width is defined as $P_0$ and the application pulse width during heat treating as $P_1$ said electrical signals are applied at a pulse width within the range of 1.30 to 1.55 of P-value which is their ratio ($=P_1/P_0$).

7. A method according to claim 1, wherein the electrical signals for said heat treating are given by direct current.

8. A method according to claim 7, wherein said electrical signals are applied at a current value of 30 mA or higher per heater.

9. A method according to claim 1, wherein said aging step is performed after completion of said liquid jet recording head and before mounting said head onto the liquid jet recording device.

10. A method according to claim 1, wherein said aging step is performed in the course of preparation of said liquid jet recording head after formation of said electro-thermal energy convertor.

11. A method according to claim 1, wherein said aging step is performed after mounting of said liquid jet recording head completed onto the liquid jet recording device.

12. A method according to claim 9, wherein said aging step is performed under the state where ink is filled in said liquid jet recording head.

13. A method according to claim 11, wherein said aging step is performed under the state where ink is filled in said liquid jet recording head.

14. A liquid jet recording head having an opening, a liquid pathway communicating with said opening and an electro-thermal energy convertor for generating heat energy for discharging ink from said opening by applying electrical signals to said electro-thermal convertor, said electro-thermal energy convertor comprising a heat-generating resistor and a pair of electrodes for applying electrical signals to said heat-generating resistor, said liquid jet recording head being prepared by aging said heat-generating resistor by applying to said electrodes electrical signals sufficient to stabilize the resistance value of said heat-generating resistor by heat-treating said heat generating resistor through heat generation therein.

15. A liquid jet recording head according to claim 14, wherein the electrical signals for said heat treating are high frequency signals.

16. A liquid jet recording head according to claim 14, wherein said electrical signals for heat treating have a larger pulse width and/or voltage value than the electrical signals used for discharging liquid.

17. A liquid jet recording head according to claim 16, wherein when the foaming initiating voltage is defined as $V_0$ and the application voltage during heat treating as V, said electrical signals are applied at a voltage within the range of 1.15 to 1.25 of K-value which is their ratio ($=V/V_0$).

18. A liquid jet recording head according to claim 16, wherein when the foaming initiating pulse width is defined as $P_0$ and the application pulse width during heat-treating as $P_1$, said electrical signals are applied at a pulse width within the range of 1.15 to 1.25 of P-value which is their ratio ($=P_1/P_0$).

19. A liquid jet recording head according to claim 14, wherein the electrical signals for said heat treating are given by direct current.

20. A liquid jet recording head according to claim 19, wherein said electrical signals are applied at a current value of 30 mA or higher per heater.

21. A liquid jet recording head according to claim 14, wherein said aging process is performed after completion of said liquid jet recording head and before mounting said heat onto the liquid jet recording device.

22. A liquid jet recoridng head according to claim 14, wherein said aging process is performed in the course of preparation of said liquid jet recording head after formation of said electro-thermal energy convertor.

23. A liquid jet recording head according to claim 14, wherein said aging process is performed after mounting of said liquid jet recording head completed onto the liquid jet recording device.

24. A liquid jet recording head according to claim 21, wherein said aging process is performed under the state where ink is filled in said liquid jet recording head.

25. A liquid jet recording head according to claim 23, wherein said aging process is performed under the state where ink is filled in said liquid jet recording head.

26. A liquid jet recording device, comprising:

a liquid jet recording head having an electro-thermal convertor for generating heat energy for discharging ink by applying electrical signals to said electro-thermal convertor, said electro-thermal convertor comprising a heat-generating resistor and a pair of electrodes for applying electrical signals to said heat-generating resistor, the liquid jet recording head being prepared by aging said heat-generating resistor by applying to said electrodes electrical signals sufficient to stabilize the resistance value of said heat-generating resistor by heat treating said heat-generating resistor through heat generation therein; and means for providing adequate discharge of ink from said liquid jet recording head.

27. A liquid jet recording device according to claim 26, wherein said aging process is performed after completion of said liquid jet recording head and before mounting onto the liquid jet recording device.

28. A liquid jet recording device according to claim 26, wherein said aging process is performed in the course of preparation of said liquid jet recording head after formation of said electro-thermal energy convertor.

29. A liquid jet recording device according to claim 26, wherein said aging process is performed after mounting of said liquid jet recording head completed onto the liquid jet recording device.

30. A liquid jet recording device according to claim 27, wherein said aging process is performed under the state where ink is filled in said liquid jet recording head.

31. A liquid jet recording device according to claim 29, wherein said aging process is performed under the state where ink is filled in said liquid jet recording head.

32. A liquid jet recording device according to claim 26, wherein said means for providing adequate discharge of ink comprises either preliminary discharging treatment control means, preliminary heating treatment control means or restoration treatment control means or a combination of two or more of these.

33. A method for preparing a liquid jet recording head, comprising the steps of:

providing a liquid jet recording head having an electro-thermal energy convertor for generating heat energy for discharging ink by applying electrical signals to said electro-thermal convertor, said electro-thermal energy convertor comprising a heat-generating resistor and a pair of electrodes for applying electrical signals to said heat-generating resistor; and aging said heat-generating resistor by applying to said electrodes electrical signals sufficient to stabilize the resistance value of said heat-generating resistor by heat treating said heat-generating resistor through heat generation therein, the signals applied during the aging step being different from the signals applied during image recording, preliminary discharging or preliminary heating.

* * * * *

UNITED STATES PATENT AND TRADEMARK OFFICE
CERTIFICATE OF CORRECTION

PATENT NO. : 4,929,964

DATED : May 29, 1990

INVENTOR(S) : Sato et al.

It is certified that error appears in the above-identified patent and that said Letters Patent is hereby corrected as shown below: Title page:

AT [30], Foreign Application Priority Data

Line 2, insert --May 31, 1989 [JP] Japan ........ 1-138294--.

COLUMN 1

Line 23, "thereon" should read --thereon.--;

Line 28, "system," should read --systems,--;

Line 41, "portions" should read --portions for--; and

Line 50, "heater" should read --the heater--.

COLUMN 2

Line 42, "2169856" (first occurrence) should read --2169855--.

COLUMN 6

Line 5, "recording liquid" (first occurrence) should read --liquid channel 14-- and after "recording liquid" (second occurrence) --, which flows-- should be inserted.

UNITED STATES PATENT AND TRADEMARK OFFICE
CERTIFICATE OF CORRECTION

PATENT NO. : 4,929,964

DATED : May 29, 1990

INVENTOR(S) : Sato et al.

It is certified that error appears in the above-identified patent and that said Letters Patent is hereby corrected as shown below:

COLUMN 7

Line 17, "heat" should read --head--; and

Line 52, "persist" should read --maintain--.

COLUMN 8

Line 19, "in" should be deleted;

Line 55, "greatness" should be deleted;

Line 62, "these" should be deleted; and

Line 65, "high K value." should read --high K values.--.

COLUMN 9

Line 2, "is" should read --and is--; and

Line 12, "fewer" should read --a smaller--.

COLUMN 10

Line 64, "conditions," should read --conditions and--.

UNITED STATES PATENT AND TRADEMARK OFFICE

CERTIFICATE OF CORRECTION

PATENT NO. : 4,929,964 Page 3 of 3

DATED : May 29, 1990

INVENTOR(S) : Sato et al.

It is certified that error appears in the above-identified patent and that said Letters Patent is hereby corrected as shown below:

COLUMN 11

Line 22, "in expensively" should read --inexpensively--;

Line 30, "to" should read --capable of-- and "in" should read --of--; and

Line 58, "heat treatment" should read --heat treating--.

COLUMN 13

Line 7, "heat" should read --head--; and

Line 8, "recoridng head" should read --recording head--.

Signed and Sealed this

Twenty-ninth Day of December, 1992

*Attest:*

DOUGLAS B. COMER

*Attesting Officer* *Acting Commissioner of Patents and Trademarks*

UNITED STATES PATENT AND TRADEMARK OFFICE
CERTIFICATE OF CORRECTION

PATENT NO. : 4,929,964

DATED : May 29, 1990

INVENTOR(S) : Sato et al.

It is certified that error appears in the above-identified patent and that said Letters Patent is hereby corrected as shown below:

COLUMN 7

Line 17, "heat" should read --head--; and
Line 52, "persist" should read --maintain--.

COLUMN 8

Line 19, "in" should be deleted;
Line 55, "greatness" should be deleted;
Line 62, "these" should be deleted; and
Line 65, "high K value." should read --high K values.--.

COLUMN 9

Line 1, "are" should read --is--;
Line 2, "is" should read --and is--; and
Line 12, "fewer" should read --a smaller--.

UNITED STATES PATENT AND TRADEMARK OFFICE
CERTIFICATE OF CORRECTION

PATENT NO. : 4,929,964

DATED : May 29, 1990

INVENTOR(S) : Koichi Sato, et al.

It is certified that error appears in the above-identified patent and that said Letters Patent is hereby corrected as shown below:

Column 10, line 64, "conditions," should read --conditions and --.

This certificate supersedes Certificate of Correction issued December 29,1992.

Signed and Sealed this

Twenty-first Day of December, 1993

*Attest:*

BRUCE LEHMAN

*Attesting Officer*

*Commissioner of Patents and Trademarks*

US004929964B1

REEXAMINATION CERTIFICATE (2850th)

United States Patent [19]

Sato et al.

[11] B1 4,929,964

[45] Certificate Issued Apr. 23, 1996

[54] METHOD FOR PREPARING LIQUID JET RECORDING HEAD, LIQUID JET RECORDING HEAD PREPARED BY SAID METHOD AND LIQUID JET RECORDING DEVICE HAVING SAID LIQUID JET RECORDING HEAD MOUNTED THEREON

[75] Inventors: Koichi Sato, Yokohama; Masami Ikeda, Tokyo, both of Japan

[73] Assignee: Canon Kabushiki Kaisha, Tokyo, Japan

Reexamination Request:
No. 90/003,589, Oct. 4, 1994

Reexamination Certificate for:
Patent No.: 4,929,964
Issued: May 29, 1990
Appl. No.: 363,524
Filed: Jun. 7, 1989

Certificate of Correction issued Dec. 29, 1992.

[30] Foreign Application Priority Data

Jun. 7, 1988 [JP] Japan .................................. 63-138418

[51] Int. Cl.[6] .................................................. B41J 2/05
[52] U.S. Cl. .................................................. 347/62
[58] Field of Search .................................. 347/62, 61, 57, 347/58; 29/620

[56] References Cited

U.S. PATENT DOCUMENTS

| | | | |
|---|---|---|---|
| 3,261,082 | 7/1966 | Maissel et al. | 29/155.7 |
| 3,308,528 | 3/1967 | Bullard | 29/620 |
| 3,457,637 | 7/1969 | Halpern | 29/620 |
| 4,210,966 | 7/1980 | Amemiya | 29/620 X |
| 4,343,986 | 8/1982 | Mitani et al. | 219/216 |
| 4,345,262 | 8/1982 | Shirato et al. | 347/57 |
| 4,719,477 | 1/1988 | Hess | 347/59 |
| 4,782,202 | 11/1988 | Sawae | 29/610.1 X |

FOREIGN PATENT DOCUMENTS

| | | | |
|---|---|---|---|
| 63-3972 | 1/1988 | Japan | B41J 3/20 |
| 1-34746 | 2/1989 | Japan | B41J 3/04 |

*Primary Examiner*—Joseph W. Hartary

[57] ABSTRACT

A method for preparing a liquid jet recording head which is to be used for generating heat energy to be utilized for discharging ink by applying electrical signals, having an electricity-heat energy convertor comprising a heat-generating resistor and a pair of electrodes for applying electrical signals on said heat-generating resistor, comprises the process of aging by heat treating the heat-generating resistor by applying electrical signals to said electrodes sufficient to stabilize the resistance value of said heat-generating resistor.

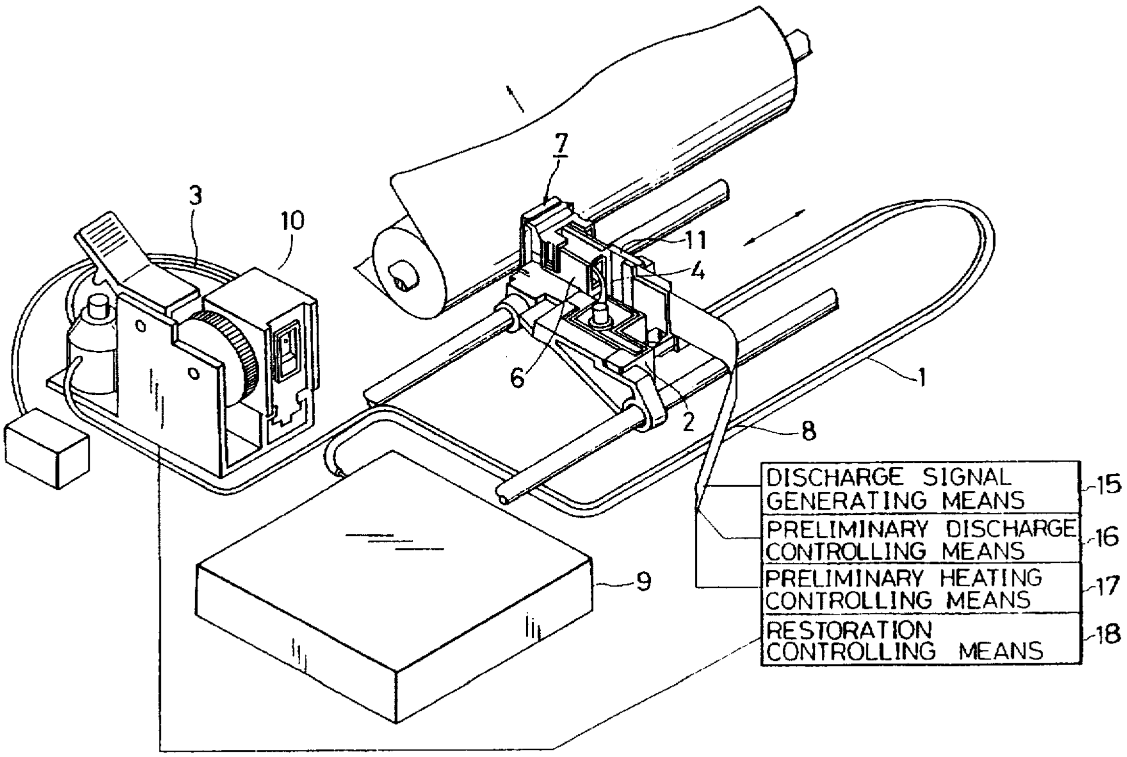

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11, 14, 23, 26, 29 and 33 are determined to be patentable as amended.

Claims 2–10, 12, 13, 15–22, 24, 25, 27, 28 and 30–32, dependent on an amended claim, are determined to be patentable.

1. A method for preparing a liquid jet recording head, comprising the steps of:

providing a liquid jet recording head having an electro-thermal energy convertor for generating heat energy for discharging ink by applying electrical signals to said electro-thermal convertor, said electro-thermal energy convertor comprising a heat-generating resistor *in a liquid channel* and a pair of electrodes for applying electrical signals to said heat-generating resistor;

*filling said liquid channel with ink;* and aging said heat-generating resistor by applying to said electrodes electrical signals sufficient to stabilize the resistance value of said heat-generating resistor by heat treating said heat-generating resistor through heat generation therein *while said liquid channel is filled with ink to further improve ink discharging properties of said recording head.*

11. A method according to claim 1, wherein said aging step is performed after mounting of said liquid jet recording head [completed] onto the liquid jet recording device.

14. A liquid jet recording head having an opening, a liquid pathway communicating with said opening and an electro-thermal energy convertor for generating heat energy for discharging ink from said opening by applying electrical signals to said electro-thermal convertor, said electro-thermal energy convertor comprising a heat-generating resistor *in said liquid pathway* and a pair of electrodes for applying electrical signals to said heat-generating resistor, said liquid jet recording head being prepared by aging said heat-generating resistor by *filling said liquid pathway with ink and* applying to said electrodes electrical signals sufficient to stabilize the resistance value of said heat-generating resistor by heat-treating said heat-generating resistor through heat generation therein *while said liquid channel is filled with ink to further improve ink discharging properties of said recording head.*

23. A liquid jet recording head according to claim 14, wherein said aging process is performed after mounting of said liquid jet recording head [completed] onto the liquid jet recording device.

26. A liquid jet recording device, comprising:

a liquid jet recording head having an electro-thermal convertor for generating heat energy for discharging ink by applying electrical signals to said electro-thermal convertor, said electro-thermal convertor comprising a heat-generating resistor *in a liquid channel* and a pair of electrodes for applying electrical signals to said heat-generating resistor, the liquid jet recording head being prepared by *filling said liquid channel with ink and* aging said heat-generating resistor by applying to said electrodes electrical signals sufficient to stabilize the resistance value of said heat-generating resistor by heat treating said heat-generating resistor through heat generation therein *while said liquid channel is filled with ink to further improve ink discharging properties of said recording head*; and means for providing adequate discharge of ink from said liquid jet recording head.

29. A liquid jet recording device according to claim 26, wherein said aging process is performed after mounting of said liquid jet recording head [completed] onto the liquid jet recording device.

33. A method for preparing a liquid jet recording head, comprising the steps of:

providing a liquid jet recording head having an electro-thermal energy convertor for generating heat energy for discharging ink by applying electrical signals to said electro-thermal convertor, said electro-thermal energy convertor comprising a heat-generating resistor *in a liquid channel* and a pair of electrodes for applying electrical signals to said heat-generating resistor;

*filling said liquid channel with ink;* and aging said heat-generating resistor by applying to said electrodes electrical signals sufficient to stabilize the resistance value of said heat-generating resistor by heat treating said heat-generating resistor through heat generation therein *while said liquid channel is filled with ink to further improve ink discharging properties of said recording head*, the signals applied during the aging step being different from the signals applied during image recording, preliminary discharging or preliminary heating.

* * * * *